US010558416B2

(12) United States Patent
Suzuki et al.

(10) Patent No.: US 10,558,416 B2
(45) Date of Patent: Feb. 11, 2020

(54) IMAGE DISPLAY DEVICE

(71) Applicant: SUBARU CORPORATION, Tokyo (JP)

(72) Inventors: Dan Suzuki, Tokyo (JP); Makoto Kinoshita, Tokyo (JP); Toru Yamazumi, Tokyo (JP); Kentarou Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 68 days.

(21) Appl. No.: 15/888,707

(22) Filed: Feb. 5, 2018

(65) Prior Publication Data

US 2018/0260182 A1   Sep. 13, 2018

(30) Foreign Application Priority Data

Mar. 10, 2017   (JP) ................. 2017-046452

(51) Int. Cl.
  *G06F 3/14*   (2006.01)
  *H04N 9/31*   (2006.01)
  (Continued)

(52) U.S. Cl.
  CPC ............. *G06F 3/1423* (2013.01); *B60Q 1/50* (2013.01); *G02B 27/0101* (2013.01);
  (Continued)

(58) Field of Classification Search
  CPC ............ G01C 21/3632; G01C 21/3635; G09G 5/377; G09G 2340/10; G09G 2340/12; G06T 2207/20221
  See application file for complete search history.

(56) References Cited

U.S. PATENT DOCUMENTS 5,654,705 A   8/1997   Houten et al.
6,662,108 B2   12/2003   Miller et al.
(Continued)

FOREIGN PATENT DOCUMENTS

EP   2233356 A1   9/2010
JP   11-263145 A   9/1999
(Continued)

OTHER PUBLICATIONS

Japanese Office Action issued in corresponding Japanese Patent Application No. 2017-046049, dated Aug. 7, 2018, with English Translation.
(Continued)

*Primary Examiner* — Gerald Johnson
(74) *Attorney, Agent, or Firm* — McDermott Will & Emery LLP

(57) ABSTRACT

Provided is an image display device for a vehicle, in which the vehicle travels on a road and includes a first image display unit that displays a transmissive image inside the vehicle for an occupant. The image display device includes a second image display unit and a display controller. The second image display unit displays a road-surface image on a road surface of the road. The display controller stops displaying any one of the transmissive image and the road-surface image, on the condition that the transmissive image displayed by the first image display unit and the road-surface image displayed by the second image display unit appear superimposed on each other.

15 Claims, 8 Drawing Sheets

(51) Int. Cl.
   *B60Q 1/50* (2006.01)
   *G02B 27/01* (2006.01)
   *B60Q 1/04* (2006.01)

(52) U.S. Cl.
   CPC ............ *H04N 9/3194* (2013.01); *B60Q 1/04* (2013.01); *B60Q 2400/50* (2013.01)

(56) References Cited

U.S. PATENT DOCUMENTS

| | | |
|---|---|---|
| 8,269,652 B2 | 9/2012 | Seder et al. |
| 8,954,252 B1 | 2/2015 | Urmson et al. |
| 8,996,224 B1 | 3/2015 | Herbach et al. |
| 9,135,754 B2 | 9/2015 | Ng-Thow-Hing et al. |
| 9,475,422 B2 | 10/2016 | Hillis et al. |
| 9,558,409 B2 | 1/2017 | Pliefke et al. |
| 9,575,176 B2 | 2/2017 | Baba |
| 9,654,738 B1 | 5/2017 | Ferguson et al. |
| 9,849,784 B1 | 12/2017 | Chan et al. |
| 9,896,107 B1 | 2/2018 | Huang |
| 9,902,311 B2 | 2/2018 | Sweeney et al. |
| 9,905,132 B2 | 2/2018 | Habu |
| 9,925,989 B2 | 3/2018 | Lee |
| 9,947,221 B1 | 4/2018 | Mazzola |
| 9,952,054 B2 | 4/2018 | An et al. |
| 9,969,326 B2 | 5/2018 | Ross et al. |
| 9,978,280 B2 | 5/2018 | Lee et al. |
| 9,988,047 B2 | 6/2018 | Johnson et al. |
| 10,048,688 B2 | 8/2018 | Ramasamy |
| 10,089,537 B2 | 10/2018 | Nix et al. |
| 2002/0140555 A1 | 10/2002 | Jette et al. |
| 2005/0278098 A1 | 12/2005 | Breed |
| 2006/0055525 A1 | 3/2006 | Kubota et al. |
| 2007/0067081 A1 | 3/2007 | Ton |
| 2008/0040004 A1 | 2/2008 | Breed |
| 2008/0175012 A1 | 7/2008 | Shimaoka et al. |
| 2008/0243389 A1 | 10/2008 | Inoue et al. |
| 2008/0312832 A1 | 12/2008 | Greene et al. |
| 2008/0312833 A1 | 12/2008 | Greene et al. |
| 2009/0160678 A1 | 6/2009 | Turnbull |
| 2010/0030474 A1 | 2/2010 | Sawada |
| 2010/0082251 A1 | 4/2010 | Kogure |
| 2011/0128139 A1 | 6/2011 | Tauchi et al. |
| 2011/0184617 A1 | 7/2011 | Hegemann et al. |
| 2012/0140988 A1 | 6/2012 | Takahashi |
| 2012/0194356 A1 | 8/2012 | Haines et al. |
| 2012/0224060 A1* | 9/2012 | Gurevich .................. B60R 1/00 348/148 |
| 2013/0057690 A1 | 3/2013 | Mitsugi |
| 2014/0062685 A1 | 3/2014 | Tamatsu et al. |
| 2014/0152488 A1 | 6/2014 | Baba |
| 2015/0103174 A1 | 4/2015 | Emura et al. |
| 2015/0179073 A1 | 6/2015 | Suzuno |
| 2015/0194082 A1 | 7/2015 | McEwan |
| 2015/0260540 A1* | 9/2015 | Ishikawa ............ G01C 21/3632 701/436 |
| 2015/0334269 A1 | 11/2015 | Yokota et al. |
| 2016/0039286 A1 | 2/2016 | Shibata et al. |
| 2016/0093207 A1 | 3/2016 | Di Censo et al. |
| 2016/0115650 A1 | 4/2016 | Leung |
| 2016/0247393 A1 | 8/2016 | Okamoto et al. |
| 2016/0332568 A1 | 11/2016 | Kim |
| 2017/0043705 A1 | 2/2017 | Mizuno |
| 2017/0140651 A1* | 5/2017 | Lee .................. G08G 1/166 |
| 2017/0182934 A1 | 6/2017 | Arita et al. |
| 2017/0210283 A1 | 7/2017 | Ishida |
| 2017/0217361 A1 | 8/2017 | Miller |
| 2017/0217368 A1 | 8/2017 | Lewis et al. |
| 2017/0217422 A1 | 8/2017 | Nakamura |
| 2017/0240096 A1 | 8/2017 | Ross et al. |
| 2017/0253177 A1 | 9/2017 | Kawamata et al. |
| 2017/0253181 A1 | 9/2017 | Choi et al. |
| 2017/0259734 A1 | 9/2017 | Imaishi et al. |
| 2017/0276308 A1 | 9/2017 | Nakazawa et al. |
| 2017/0330463 A1 | 11/2017 | Li et al. |
| 2017/0337821 A1 | 11/2017 | Masuda et al. |
| 2017/0372613 A1 | 12/2017 | Habu |
| 2018/0009374 A1 | 1/2018 | Kim et al. |
| 2018/0024562 A1 | 1/2018 | Bellaiche |
| 2018/0025235 A1 | 1/2018 | Fridman |
| 2018/0033306 A1 | 2/2018 | Kim et al. |
| 2018/0086346 A1 | 3/2018 | Fujisawa et al. |
| 2018/0118099 A1 | 5/2018 | Kunii et al. |
| 2018/0118106 A1 | 5/2018 | You et al. |
| 2018/0134286 A1 | 5/2018 | Yi et al. |
| 2018/0141484 A1 | 5/2018 | Haneda et al. |
| 2018/0173234 A1 | 6/2018 | Van Laack et al. |
| 2018/0173237 A1 | 6/2018 | Reiley et al. |
| 2018/0218601 A1 | 8/2018 | Aoki et al. |
| 2018/0247540 A1 | 8/2018 | Hagawa et al. |
| 2018/0250596 A1 | 9/2018 | Kim |
| 2018/0253609 A1 | 9/2018 | Potter et al. |
| 2018/0257547 A1 | 9/2018 | Suzuki et al. |
| 2018/0257549 A1 | 9/2018 | Suzuki et al. |
| 2018/0257550 A1 | 9/2018 | Suzuki et al. |
| 2018/0261080 A1 | 9/2018 | Suzuki et al. |
| 2018/0261081 A1 | 9/2018 | Suzuki et al. |

FOREIGN PATENT DOCUMENTS

| | | |
|---|---|---|
| JP | 2006-252264 A | 9/2006 |
| JP | 2008-007079 A | 1/2008 |
| JP | 2008143510 A | 6/2008 |
| JP | 2009149152 A | 7/2009 |
| JP | 2009-230701 A | 10/2009 |
| JP | 4720650 B2 | 7/2011 |
| JP | 2013-203251 A | 10/2013 |
| JP | 2014-189198 A | 10/2014 |
| JP | 2015-205572 A | 11/2015 |
| JP | 2016-020876 A | 2/2016 |
| JP | 2016-107777 A | 6/2016 |
| JP | 2017-001501 A | 1/2017 |
| JP | 2017-007502 A | 1/2017 |
| JP | 2017-049885 A | 3/2017 |
| JP | 2017-159699 A | 9/2017 |
| WO | 2016/024316 A1 | 2/2016 |
| WO | 2016/039288 A1 | 3/2016 |
| WO | 2016/163294 A1 | 10/2016 |

OTHER PUBLICATIONS

Japanese Decision to Grant a Patent issued in corresponding Japanese Patent Application No. 2017-046045, dated Oct. 2, 2018, with English Translation.

Japanese Office Action dated Jul. 24, 2018, with English translation, issued in corresponding Japanese Patent Application No. 2017-046047.

Japanese Office Action dated Aug. 7, 2018, with English translation, issued in corresponding Japanese Patent Application No. 2017-046050.

Japanese Office Action dated Sep. 11, 2018, with English translation, issued in corresponding Japanese Patent Application No. 2017-046052.

Japanese Office Action, dated Jul. 24, 2018, with English Translation, issued in related Japanese Patent Application No. 2017-046045.

Non-Final Office Action dated Oct. 17, 2018, issued in related U.S. Appl. No. 15/877,859.

Non-Final Office Action dated Jul. 11, 2018, issued in related U.S. Appl. No. 15/890,963.

Non-Final Office Action dated Oct. 25, 2018, issued in related U.S. Appl. No. 15/888,791.

Non-Final Office Action dated Jun. 4, 2018, issued in related U.S. Appl. No. 15/877,901.

Final Office Action dated Oct. 30, 2018, issued in related U.S. Appl. No. 15/877,901.

Non-Final Office Action, dated Jan. 2, 2019, issued in related U.S. Appl. No. 15/890,918.

Non-Final Office Action, dated Jul. 24, 2018, issued in related U.S. Appl. No. 15/888,858.

(56) References Cited

OTHER PUBLICATIONS

Notice of Allowance issued in related U.S. Appl. No. 15/890,963, dated Dec. 19, 2018.
Notice of Allowance issued in related U.S. Appl. No. 15/888,858, dated Feb. 8, 2019.
Notice of Allowance issued in related U.S. Appl. No. 15/877,901, dated Feb. 20, 2019.
Notice of Allowance issued in related U.S. Appl. No. 15/888,791, dated Mar. 15, 2019.
Notice of Allowance issued in related U.S. Appl. No. 15/890,918, dated May 15, 2019.
Japanese Office Action issue in corresponding Japanese Patent Application No. 2017-046452, dated Aug. 21, 2018, with English Translation.

* cited by examiner

IMAGE DISPLAY DEVICE

CROSS-REFERENCE TO RELATED APPLICATIONS

The present application claims priority from Japanese Patent Application No. 2017-046452 filed on Mar. 10, 2017, the entire contents of which are hereby incorporated by reference.

BACKGROUND

The technology relates to an image display device, or specifically, to an image display device that displays images both inside and outside a vehicle.

A display system for a vehicle has been known that performs appropriate display for persons concerned to the vehicle. Examples of the persons concerned may include a driver of the vehicle and a surrounding person who receives a warning from the driver. For example, reference is made to Japanese Unexamined Patent Application Publication (JP-A) No. 2008-007079. The display system for the vehicle as disclosed in JP-A No. 2008-007079 displays an image for the driver and an image for the surrounding person. The image for the driver may be intended for the driver. The image for the surrounding person may be intended for the surrounding person. The image for the driver and the image for the surrounding person may be displayed at different locations from each other.

SUMMARY

However, displaying the images at the different locations from each other, i.e., displaying the images both inside and outside the vehicle, causes an occupant of the vehicle difficulty in accurately understanding information regarding both of the images. This easily makes the occupant confused.

It is desirable to provide an image display device that makes it possible to make an occupant of a vehicle less confused by images displayed both inside and outside the vehicle.

An aspect of the technology provides an image display device for a vehicle, in which the vehicle travels on a road and includes a first image display unit configured to display a transmissive image inside the vehicle for an occupant. The image display device includes a second image display unit and a display controller. The second image display unit is configured to display a road-surface image on a road surface of the road. The display controller is configured to stop displaying any one of the transmissive image and the road-surface image, on the condition that the transmissive image displayed by the first image display unit and the road-surface image displayed by the second image display unit appear superimposed on each other.

DETAILED DESCRIPTION

[Basic Implementation]

In the following, an image display device according to one implementation of the technology is described with reference to FIGS. 1 and 2.

Figure 1:
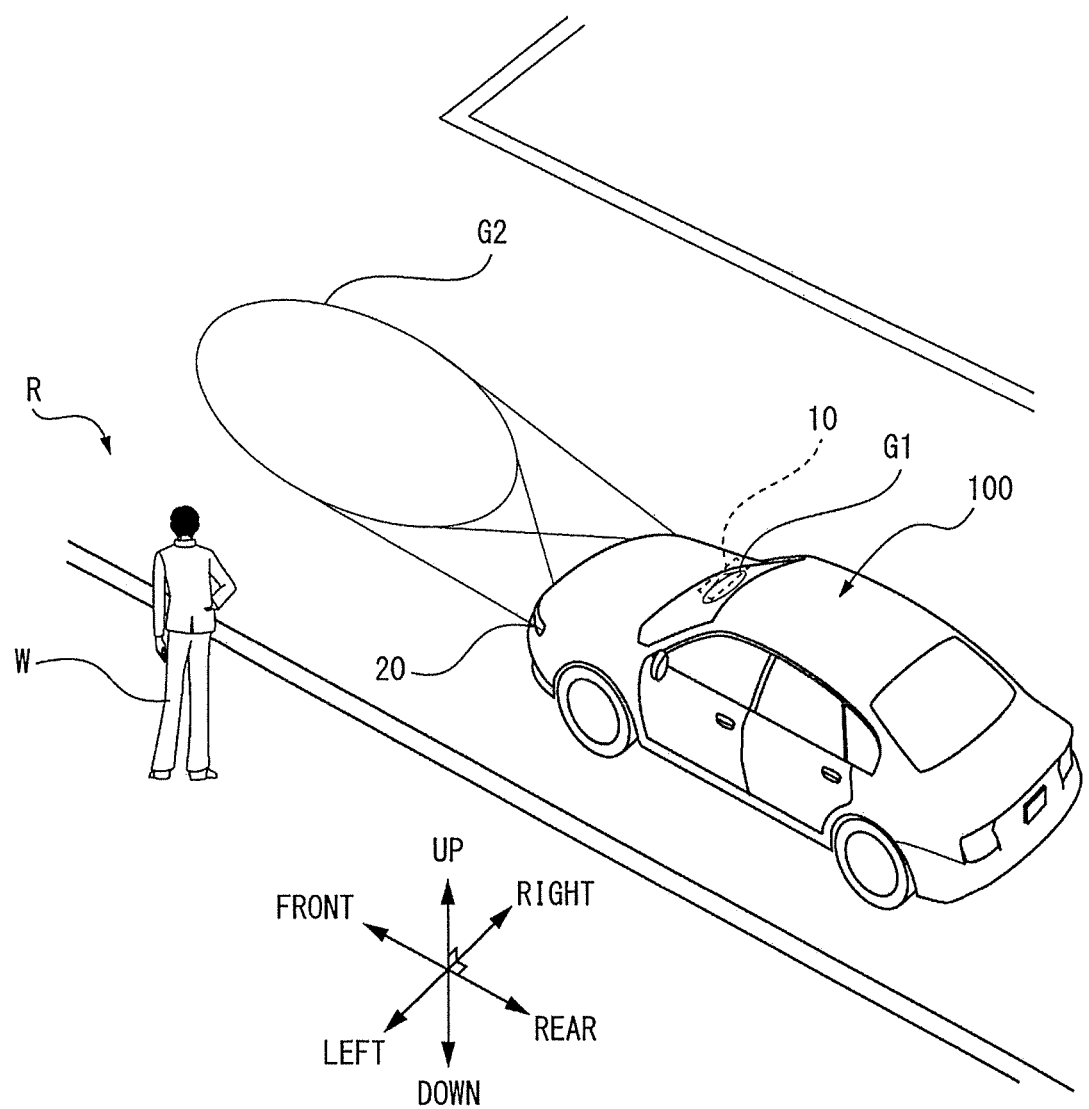
FIG. 1 schematically illustrates, in perspective, one example as to how a vehicle including an image display device according to one implementation of the technology displays images.

FIG. 1 schematically illustrates, in perspective, one example as to how a vehicle 100 including an image display device 1 according to the implementation of the technology displays images. FIG. 2 schematically illustrates the vehicle 100 illustrated in FIG. 1, as viewed from sideward.

Figure 2:
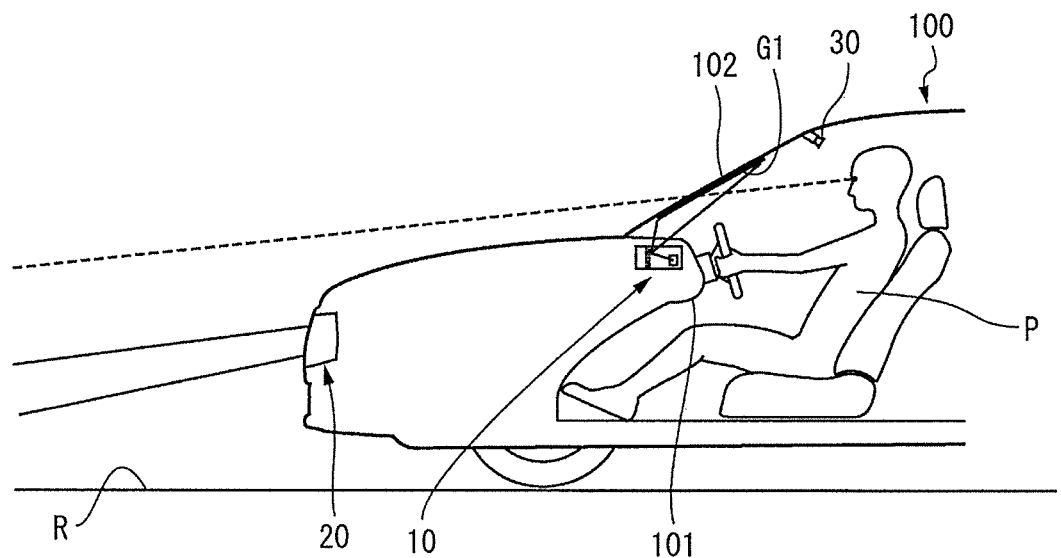
FIG. 2 schematically illustrates the vehicle illustrated in FIG. 1, as viewed from sideward.

Referring to FIGS. 1 and 2, the vehicle 100 travels on a road including a road surface R. The vehicle 100 may include a first image display unit 10 and a second image display unit 20.

The first image display unit 10 displays a transmissive image G1 inside the vehicle 100 for an occupant P. In this implementation, the first image display unit 10 may be, for example, a head-up display device. In the first image display unit 10, an image may be projected from an instrument panel 101 on a front windshield 102 of the vehicle 100. Thus, the image may be displayed as the transmissive image G1.

It is to be noted that in this implementation, for example, adopted may be an alternative configuration in which the transmissive image G1 is projected on a transparent plate, instead of the configuration in which the transmissive image G1 is projected on the front windshield 102. The transparent plate may be vertically disposed in front of a steering wheel and above the instrument panel 101.

In this implementation, the occupant P may be, for example, a driver of the vehicle 100. In what follows, therefore, description and illustration are given on a case where the occupant P is the driver. It is to be noted that in one implementation of the technology, the occupant P is not limited to the driver, insofar as the occupant P is an occupant of the vehicle 100 who is able to visually recognize the transmissive image G1 displayed by the first image display unit 10 and a road-surface image G2 displayed by the second image display unit 20.

The second image display unit 20 displays the road-surface image G2 on the road surface R. In this implementation, the second image display unit 20 may include, for example, headlights. The headlights may include light-distribution-variable multi-light-source headlights provided in a front part of the vehicle 100. In other words, the road-surface image G2 may be displayed with the use of the headlights.

In one implementation of the technology, the second image display unit 20 is not limited to the headlights as mentioned above, insofar as the second image display unit 20 is able to display the road-surface image G2 on the road surface R. Non-limiting examples may include a digital mirror device and a projector.

It is to be noted that in one implementation of the technology, as a configuration to display the images, various configurations may be adopted insofar as the configurations are in consistency with what the implementation of the technology aims at. Non-limiting examples may include not only a configuration in which for example, lighted characters and symbols themselves bears meanings, but also a configuration with markings edged with light distribution, and a configuration with flickering light distribution over a marking region of road markings. The marking edged with the light distribution may highlight the road markings. Non-limiting example of the road markings may include a road sign provided along a road, and regulation markings and instruction markings.

Moreover, in particular, as illustrated in FIG. 2, for example, a line-of-sight detection unit 30 may be provided in the vehicle 100. The line-of-sight detection unit 30 may detect a line of sight of the occupant P as denoted by a broken line in FIG. 2. In one specific but non-limiting example, the line-of-sight detection unit 30 may detect line-of-sight information by application of a driver monitoring system that is able to monitor the occupant P with the use of an in-vehicle camera. The line-of-sight information is information related to the line of sight of the occupant P, e.g., a direction of the line of sight. It is to be noted that other monitoring equipment than the driver monitoring system may be adopted as the line-of-sight detection unit 30 insofar as the monitoring equipment is able to detect the line-of-sight information on the occupant P.

Usages, and workings and effects of the line-of-sight detection unit 30 are described later.

Figure 3:
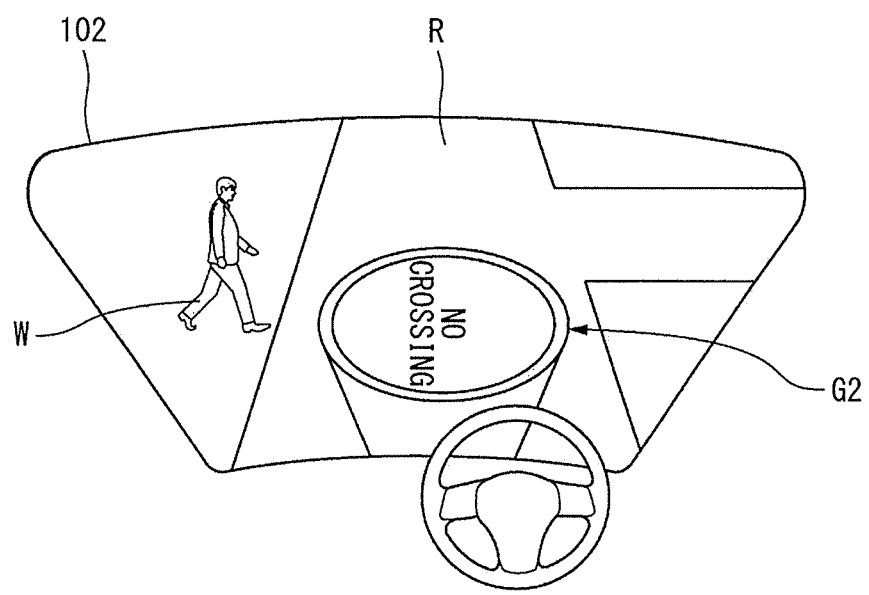
FIG. 3 schematically illustrates a visual field of an occupant in a case with solely a second image display unit being driven.
Figure 4:
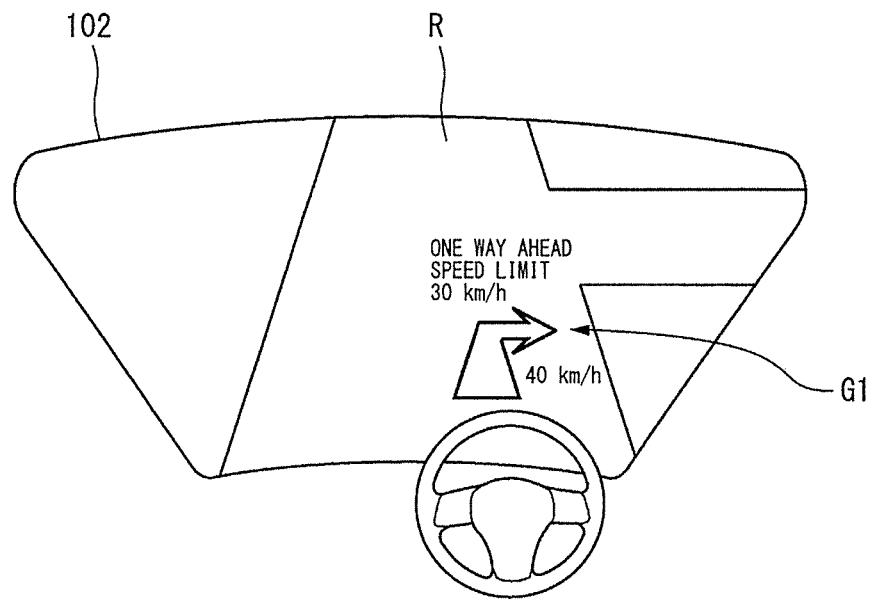
FIG. 4 schematically illustrates the visual field of the occupant in a case with solely a first image display unit being driven.
Figure 5:
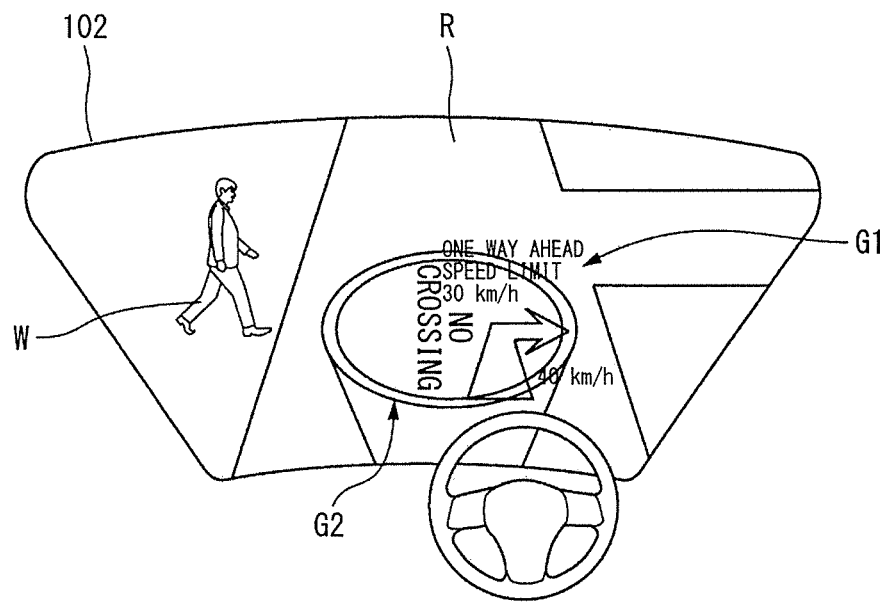
FIG. 5 schematically illustrates the visual field of the occupant in a case with both the first image display unit and the second image display unit being driven.

Described here is a viewpoint of the occupant P in a case with one or both of the first image display unit 10 and the second image display unit 20 being driven, with reference to FIGS. 3 to 5.

FIG. 3 schematically illustrates a visual field of the occupant P in a case with solely the second image display unit 20 being driven. FIG. 4 schematically illustrates the visual field of the occupant P in a case with solely the first image display unit 10 being driven. FIG. 5 schematically illustrates the visual field of the occupant P in a case with both the first image display unit 10 and the second image display unit 20 being driven.

First, for example, as illustrated in FIG. 4, in the case with solely the first image display unit 10 being driven, the transmissive image G1 is projection-displayed on the front windshield 102. In this implementation, the transmissive image G1 may be displayed as, for example, an image whose width is gradually decreased as goes upward, in order to allow the occupant P to visually recognize depth in perspective. This makes it possible for the occupant P to visually recognize the transmissive image G1 as visual information similar to the road markings on the road surface R.

Moreover, for example, as illustrated in FIG. 3, in the case with solely the second image display unit 20 being driven, the road-surface image G2 is projection-displayed on the road surface R. The road-surface image G2 may notify no-crossing to a pedestrian W who is going to cross the road regardless of the vehicle 100 approaching. In this implementation, the road-surface image G2 may be displayed, on a locus along which the pedestrian W advances, as an image oriented to allow the pedestrian W to spot and read the image. This makes it possible for the pedestrian W and the occupant P to visually recognize the road-surface image G2 as a warning image displayed on the road surface R near the pedestrian W.

It is to be noted that the transmissive image G1 illustrated in FIG. 4 may be, for example, travel guidance information for the vehicle 100, and include, for example, travel route guidance information, regulation information at a destination of guidance, and current traveling speed information. The travel route guidance information may be denoted by arrow symbols. The regulation information and the current traveling speed information may be denoted by characters. Furthermore, the road-surface image G2 illustrated in FIG. 3 may include, for example, warning information to the pedestrian W. The warning information may be denoted by characters and symbols. Items of information to be displayed as the transmissive image G1 and the road-surface image G2 may be set as appropriate for the vehicle 100 or for the occupant P. Non-limiting examples may include a kind or a category, area, an amount, the number of pieces, a color, brightness, a position, and display timing.

For example, as illustrated in FIG. 5, in the case with both the first image display unit 10 and the second image display unit 20 being driven, there may be a case where the transmissive image G1 and the road-surface image G2, as viewed by the occupant P, appear superimposed on each other, particularly in the visual field of the occupant P. At this occasion, in a visual field of the pedestrian W, only the road-surface image G2 is displayed on the locus along which the pedestrian W advances. Accordingly, the pedestrian W is unlikely to get confused. However, the occupant P may have difficulty in obtaining accurate information, particularly from part where the transmissive image G1 and the road-surface image G2 appear superimposed on each other. Accordingly, the occupant P may easily get confused.

Figure 6:
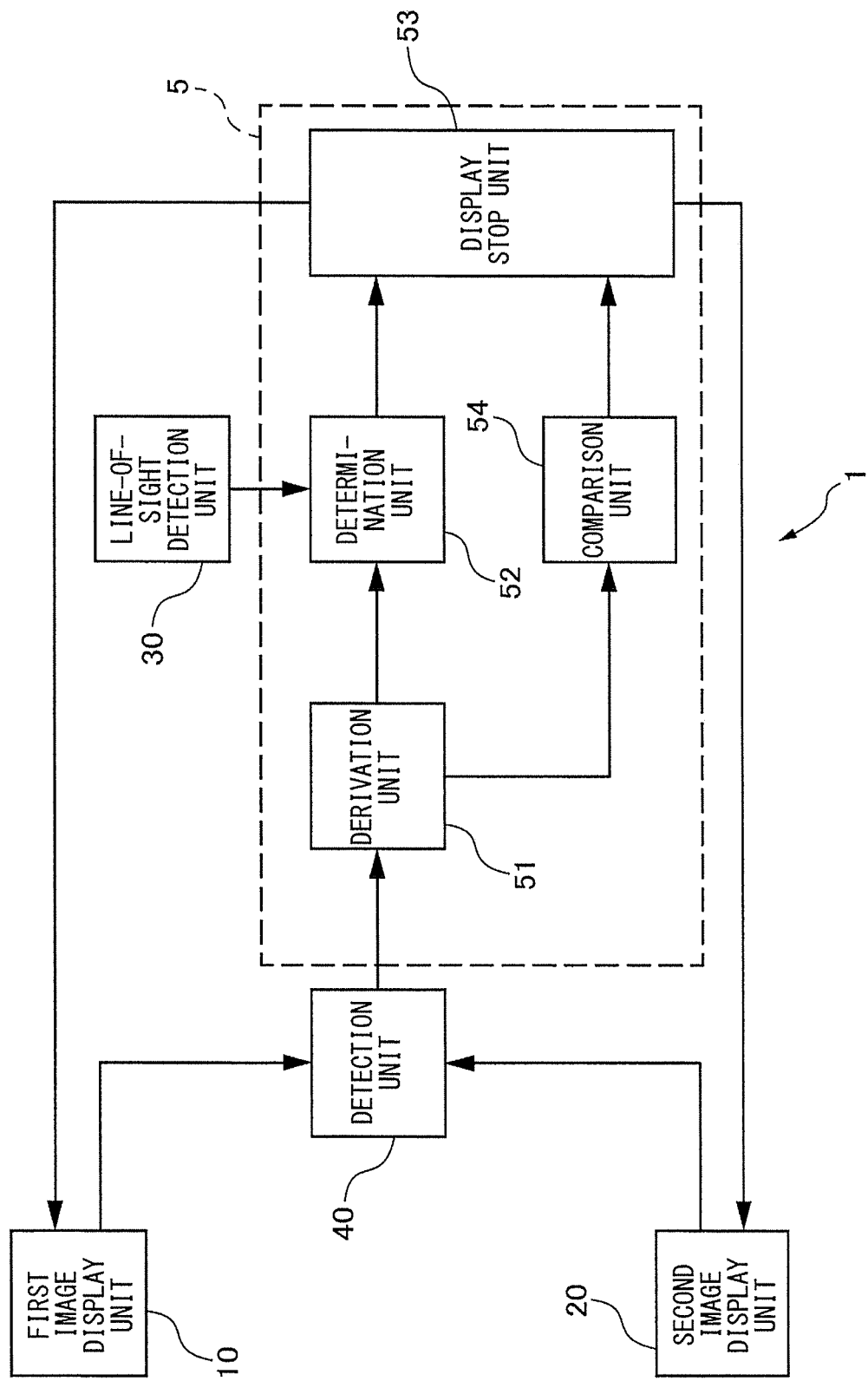
FIG. 6 is a block diagram of a configuration of the image display device according to the implementation.

In order to make the occupant P less confused in such a situation, the vehicle 100 as mentioned above includes the image display device 1 as illustrated in FIG. 6. As illustrated in FIG. 6, the image display device 1 may include the second image display unit 20, a detection unit 40, and a controller 5.

It is to be noted that FIG. 6 is a block diagram of a configuration of the image display device 1 according to one implementation of the technology.

The detection unit 40 may detect one or both of the transmissive image G1 displayed by the first image display unit 10 and the road-surface image G2 displayed by the second image display unit 20. In one preferred but non-limiting example, the detection unit 40 may detect both the transmissive image G1 and the road-surface image G2. As a configuration for the detection unit 40 to detect the images, for example, a configuration may be adopted in which imaging of the front windshield 102 and the road surface R is carried out with the use of an on-vehicle camera, to directly detect presence or absence of the images, i.e., the transmissive image G1 and the road-surface image G2. As an alternative configuration to detect the images, a possible configuration may be to indirectly detect the presence or the absence of the images, i.e., the transmissive image G1 and the road-surface image G2, by detecting image display signals supplied from an appropriate on-vehicle CPU to the first image display unit 10 and the second image display unit 20, or by detecting driving signals of the first image display unit 10 and the second image display unit 20 themselves.

The controller 5 may include a derivation unit 51, a determination unit 52, a display stop unit 53, and a comparison unit 54.

In one implementation of the technology, the controller 5 may serve as a "display controller". In one implementation of the technology, unless it is necessary to provide the determination unit 52 and the comparison unit 54 as described later to perform a fine control in accordance with the images, any "display controller" is sufficient provided that the "display controller" is able to stop displaying the images. Accordingly, in one implementation of the technology, for example, the controller 5 may include solely the display stop unit 53 as described later, and the display stop unit 53 may serve as the "display controller". Moreover, as described later, in this implementation, the controller 5 may be adopted as a constituent element that performs various kinds of processing such as a determination, a comparison, and a display stop on the basis of a detection result of the detection unit 40. However, in one implementation of the technology, constituent elements as controllers may be separately provided per each kind of processing.

The derivation unit 51 may derive image information on the transmissive image G1 and image information on the road-surface image G2. In this implementation, an image-related signal detected by the detection unit 40 may be inputted to the derivation unit 51. The derivation unit 51 may analyze the image-related signal inputted to the derivation unit 51, to derive the image information on the transmissive image G1 and the image information on the road-surface image G2.

The image information on the transmissive image G1 may include, for example, at least one kind out of display area of the image, a display amount of the image, the number of the images displayed, a display position of the image, and display contents of the image. The image information on the road-surface image G2 may include, for example, at least one kind out of display area of the image, a display amount of the image, the number of the images displayed, a display position of the image, and display contents of the image, as with the image information on the transmissive image G1 as recited above.

The determination unit 52 may determine presence or absence of superimposition of the transmissive image G1 on the road-surface image G2, on the basis of one or both of the image information on the transmissive image G1 and the image information on the road-surface image G2. In one preferred but non-limiting example, the determination unit 52 may determine the presence or the absence of the superimposition of the transmissive image G1 on the road-surface image G2, on the basis of both the image information on the transmissive image G1 and the image information on the road-surface image G2. In one more specific but non-limiting example, the determination unit 52 may determine the presence or the absence of the superimposition of the transmissive image G1 on the road-surface image G2, on the basis of the image information on the transmissive image G1 and the image information on the road-surface image G2 as mentioned above, and on the basis of the line-of-sight information on the transmissive image G1 and the line-of-sight information on the road-surface image G2 detected by the line-of-sight detection unit 30. In this implementation, a signal related to the image information derived by the derivation unit 51 may be inputted to the determination unit 52. The determination unit 52 may determine whether or not the transmissive image G1 and the road-surface image G2 appear superimposed on each other, as viewed by the occupant P inside the vehicle, on the basis of the signal related to the image information inputted to the determination unit 52. Alternatively, the determination unit 52 may determine whether or not there is high probability that the transmissive image G1 and the road-surface image G2 appear superimposed on each other, as viewed by the occupant P inside the vehicle.

The display stop unit 53 may stop displaying any one of the transmissive image G1 and the road-surface image G2, on the basis of the detection result of the detection unit 40, in a case where the transmissive image G1 and the road-surface image G2 appear superimposed on each other. In this implementation, a signal related to the presence or the absence of the superimposition may be inputted to the display stop unit 53 from the determination unit 52. The display stop unit 53 may allow any one of the first image display unit 10 and the second image display unit 20 to stop displaying the image, in a case with the presence of the superimposition of the transmissive image G1 on the road-surface image G2, as viewed by the occupant P inside the vehicle.

As a configuration for the display stop unit 53 to stop displaying the image, any configuration is sufficient provided that the configuration is able to cause any one of the transmissive image G1 and the road-surface image G2 to be non-displayed, to eliminate a superimposed state of the transmissive image G1 on the road-surface image G2, as viewed by the occupant P from inside the vehicle. Accordingly, various stop configurations may be adopted. In one specific but non-limiting example, the driving signal to any one of the first image display unit 10 and the second image display unit 20 may be stopped or blocked, to stop driving the relevant one of the first image display unit 10 and the second image display unit 20. In one alternative example, a light illuminator of any one of the first image display unit 10 and the second image display unit 20 may be covered with a movable shutter, to mask a corresponding one of the transmissive image G1 and the road-surface image G2 even if the relevant one of the first image display unit 10 and the second image display unit 20 is in operation.

The comparison unit 54 may compare the image information on the transmissive image G1 with the image information on the road-surface image G2. In this implementation, the signal related to the image information derived by the derivation unit 51 may be inputted to the comparison unit 54. The comparison unit 54 may perform a comparison of the image information, to derive magnitude of a possible influence on a travel state of the vehicle 100 in a case where a control is carried out to stop displaying any one of the transmissive image G1 and the road-surface image G2.

The travel state of the vehicle 100 may be possibly influenced by the image information such as the display area, the display amount, and the number of the images displayed. In many cases, an influence by the display contents out of the items of the image information is the largest. Examples of the influence on the travel state of the vehicle 100 by a non-superimposition control may include possibility that the vehicle 100 may have difficulty in maintaining a previous safe travel state. The non-superimposition control includes keeping the transmissive image G1 and the road-surface image G2 from appearing superimposed on each other. Specifically, for example, stopping the transmissive image G1 may cause the occupant P as the driver to fail in visually recognizing information such as navigation information. For example, stopping the road-surface image G2 may cause the pedestrian W who stopped crossing in accordance with the road-surface image G2 to start crossing the road.

In one preferred but non-limiting example, the comparison unit 54 may perform the comparison of the image information that quantifies the magnitude of the possible influence on the travel state of the vehicle 100 as mentioned above. Thus, the comparison unit 54 may easily make a decision as to whether a display control by the display stop unit 53 as described later is targeted at the transmissive image G1 or whether the control by the display stop unit 53 is targeted at the road-surface image G2, without making the decision complicated. It is to be noted that the decision as described here may be easily executed by setting in advance a conversion table in which the magnitude of the influence on the travel state of the vehicle 100 is quantified per each item of the display information.

In this implementation, the display stop unit 53 may be supplied with a signal related to a determination result by the determination unit 52, and with a signal related to a comparison result by the comparison unit 54. The signal related to the determination result may include a result of the determination as to the presence or the absence of the superimposition of the transmissive image G1 on the road-surface image G2. The signal related to the comparison result may include a result of the comparison of the image information on the transmissive image G1 with the image information on the road-surface image G2. On the basis of these signals, the display stop unit 53 may perform a display stop control of any one of the transmissive image G1 and the road-surface image G2, and a decision control as to which image to stop displaying, i.e., whether to stop displaying the transmissive image G1 or the road-surface image G2.

Figure 7:
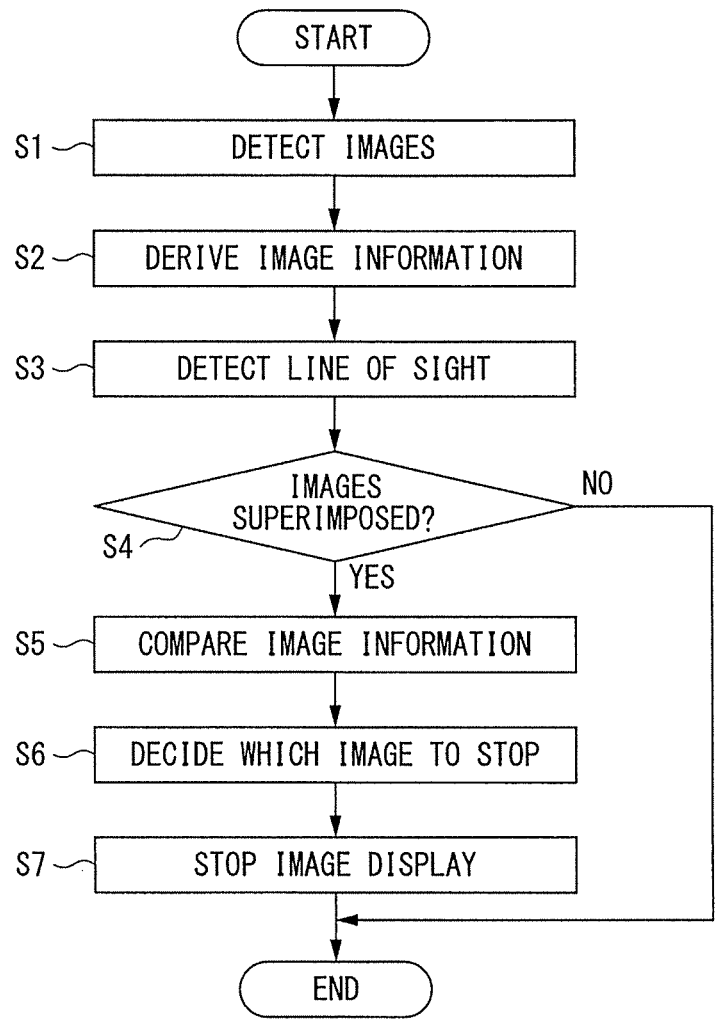
FIG. 7 is a flowchart of a control flow in performing a stop control regarding image display in the image display device illustrated in FIG. 6.

Described here is a control flow in performing the display stop control of any one of the transmissive image G1 and the road-surface image G2 with the use of the constituent elements illustrated in FIG. 6, with reference to a flowchart in FIG. 7.

First, the detection unit 40 may detect the transmissive image G1 and the road-surface image G2 (step S1). The transmissive image G1 may be displayed by driving the first image display unit 10 illustrated in FIGS. 1, 2, and 6. The road-surface image G2 may be displayed by driving the second image display unit 20 illustrated in FIGS. 1, 2, and 6.

Thereafter, the derivation unit 51 may derive one or both of the image information on the transmissive image G1 and the image information on the road-surface image G2 (step S2). In one preferred but non-limiting example, the derivation unit 51 may derive both the image information on the transmissive image G1 and the image information on the road-surface image G2. The transmissive image G1 and the road-surface image G2 may be detected by the detection unit 40. At this occasion, as the image information derived by the derivation unit 51, any information is sufficient provided that the information makes it determinable that the transmissive image G1 and the road-surface image G2 appear superimposed on each other, as viewed by the occupant P inside the vehicle, or provided that the information makes it determinable that there is high probability that the transmissive image G1 and the road-surface image G2 appear superimposed on each other, as viewed by the occupant P inside the vehicle.

For example, because of the large display area of the transmissive image G1, there may be cases with the high probability that the transmissive image G1 and the road-surface image G2 appear superimposed on each other, as viewed by the occupant P inside the vehicle, even if the display area of the road-surface image G2 is small. In this case, while the driving signal of the first image display unit 10 that displays the large transmissive image G1 may be detected, solely the display area of the transmissive image G1 may be derived. Thus, the image information related to the display area of the relevant transmissive image G1 may be outputted to the determination unit 52 that uses the image information in the subsequent process. In one alternative, the display area of each of the transmissive image G1 and the road-surface image G2 may be derived, without detecting the driving signal of each of the first image display unit 10 and the second image display unit 20. In this case, if the display area of the transmissive image G1 is larger than a threshold set in advance, solely the image information related to the display area of the relevant transmissive image G1 may be outputted to the determination unit 52.

In addition to the threshold of the display area, set in advance may be thresholds of items that increase the probability that the transmissive image G1 and the road-surface image G2 appear superimposed on each other. Non-limiting examples of such items may include the display amount, the number of the images displayed, and the display position. Thus, in a case where any one of the items, e.g., the display amount, is larger than the threshold, it is possible to output, to the determination unit 52, the image information related to the relevant item, e.g., the display amount. It is to be noted that even in a case without setting the thresholds as mentioned above, or even in a case where any one of the items, e.g., the display area, is larger than the threshold, both the image information on the transmissive image G1 and the image information on the road-surface image G2 may be outputted to the determination unit 52.

Thereafter, the line-of-sight detection unit 30 may detect the line of sight of the occupant P on the vehicle 100 (step S3). It is to be noted that the order of the line-of-sight detection process (step S3) and steps S1 and S2 may be reversed, insofar as the display stop unit 53 has not performed yet the display stop control of any one of the transmissive image G1 and the road-surface image G2.

On the basis of the image information derived in step S2 and on the basis of the line-of-sight information of the occupant P detected in step S3, the determination unit 52 may determine the presence or the absence of the superimposition of the transmissive image G1 on the road-surface image G2 (step S4). Here, regarding the transmissive image G1 displayed on the front windshield 102 and the road-surface image G2 displayed on the road surface R, the determination unit 52 may determine, on the basis of the line-of-sight information, whether or not the transmissive image G1 and the road-surface image G2 appear superimposed on each other, along the line of sight of the occupant P. In a case where a determination is made that the transmissive image G1 and the road-surface image G2 appear superimposed on each other, the flow may proceed to a next process (Yes in step S4). In a case where a determination is made that the transmissive image G1 and the road-surface image G2 do not appear superimposed on each other, the occupant P is able to obtain accurate information from each of the transmissive image G1 and the road-surface image G2. The occupant P is unlikely to get confused. It is, therefore, unnecessary to stop displaying any one of the transmissive image G1 and the road-surface image G2. In this case, the control flow may be terminated, with display states of the currently-displayed transmissive image G1 and the currently-displayed road-surface image G2 being maintained, until another piece of the transmissive image G1 or another piece of the road-surface image G2 is displayed (No in step S4).

It is to be noted that in step S2, in the case with the high probability that the transmissive image G1 and the road-surface image G2 appear superimposed on each other as mentioned above, when the image information related to, for example, the large display area is inputted to the determination unit 52, a determination may be made that the transmissive image G1 and the road-surface image G2 appear superimposed on each other, without collating the image information with the line-of-sight information (Yes in step S4).

Thereafter, in the case where the determination is made that the transmissive image G1 and the road-surface image G2 appear superimposed on each other, the comparison unit 54 may perform the comparison of the image information (step S5). Here, the image information on the transmissive image G1 and the image information on the road-surface image G2 may be compared with each other, from a viewpoint on, for example, magnitude of an influence on travel of the vehicle 100, as a preparation process of derivation of elements to decide which image to stop displaying, i.e., whether to stop displaying the transmissive image G1 or the road-surface image G2.

Furthermore, the display stop unit 53 may decide which image to stop displaying, i.e., whether to stop displaying the transmissive image G1 or the road-surface image G2 (step S6). At this occasion, on the basis of the comparison result obtained by the comparison unit 54 and inputted to the display stop unit 53, the display stop unit 53 may decide whether to stop displaying the transmissive image G1 or the road-surface image G2. More specifically, on the basis of the determination result of the determination unit 52 and on the basis of the comparison result of the comparison unit 54, the display stop unit 53 may decide whether to stop displaying the transmissive image G1 or the road-surface image G2. The display stop unit 53 may decide whichever image of the transmissive image G1 and the road-surface image G2 would have a smaller influence on the travel of the vehicle 100, if displaying the transmissive image G1 or the road-surface image G2 were stopped. Conversely, in this process, the display stop unit 53 may maintain whichever image of the transmissive image G1 and the road-surface image G2 would have a larger influence on the travel of the vehicle 100, if displaying the transmissive image G1 or the road-surface image G2 were stopped.

Thereafter, the display stop unit 53 may perform a stop control with respect to the first image display unit 10 or the second image display unit 20 that displays whichever image of the transmissive image G1 and the road-surface image G2 is decided to stop displaying (step S7). Thus, the display of the transmissive image G1 by the first image display unit 10 or the display of the road-surface image G2 by the second image display unit 20 is stopped, causing the single image, i.e., the transmissive image G1 or the road-surface image G2, to be visually recognizable for the occupant P.

Specifically, as illustrated in FIG. 5, with the transmissive image G1 and the road-surface image G2 appearing superimposed on each other, as viewed by the occupant P inside the vehicle, stopping displaying the transmissive image G1 by the first image display unit 10 causes the road-surface image G2 displayed by the second image display unit 20 to remain as illustrated in FIG. 3. Stopping displaying the road-surface image G2 by the second image display unit 20 causes the transmissive image G1 displayed by the first image display unit 10 to remain as illustrated in FIG. 4. It is to be noted that in a case where the road-surface image G2 remains as illustrated in FIG. 3, the occupant P is able to accurately visually recognize the road-surface image G2. This makes it possible for the occupant P to travel with enhanced safety while paying attention to the pedestrian W, in keeping on driving the vehicle 100. In a case where the transmissive image G1 remains as illustrated in FIG. 4, the occupant P is able to accurately visually recognize the transmissive image G1. This makes it possible for the occupant P to travel appropriately in accordance with a traffic situation while paying attention to, for example, the navigation information and the regulation information supplied by the vehicle 100.

As described, with the transmissive image G1 inside the vehicle and the road-surface image G2 outside the vehicle appearing superimposed on each other, as viewed by the occupant P, stopping displaying any one of the transmissive image G1 and the road-surface image G2 causes solely one of the transmissive image G1 and the road-surface image G2 to be visible to the occupant P. In this case, the superimposition of the transmissive image G1 on the road-surface image G2 is eliminated, leading to simplification of the image visible to the occupant P. Accordingly, the occupant P does not get confused, or is unlikely to get confused, by the travel of the vehicle 100. This eliminates difficulty for the occupant P in accurately reading the information indicated by the image. The difficulty is caused by the superimposition of the transmissive image G1 on the road-surface image G2. Hence, it is possible to make the occupant P less confused by the visually-unrecognizable images, in a case where the images, i.e., the transmissive image G1 and the road-surface image G2 are displayed inside and outside the vehicle.

[Modified Implementations]

Described below are some modified implementations of the forgoing implementation of the technology.

Figure 8:
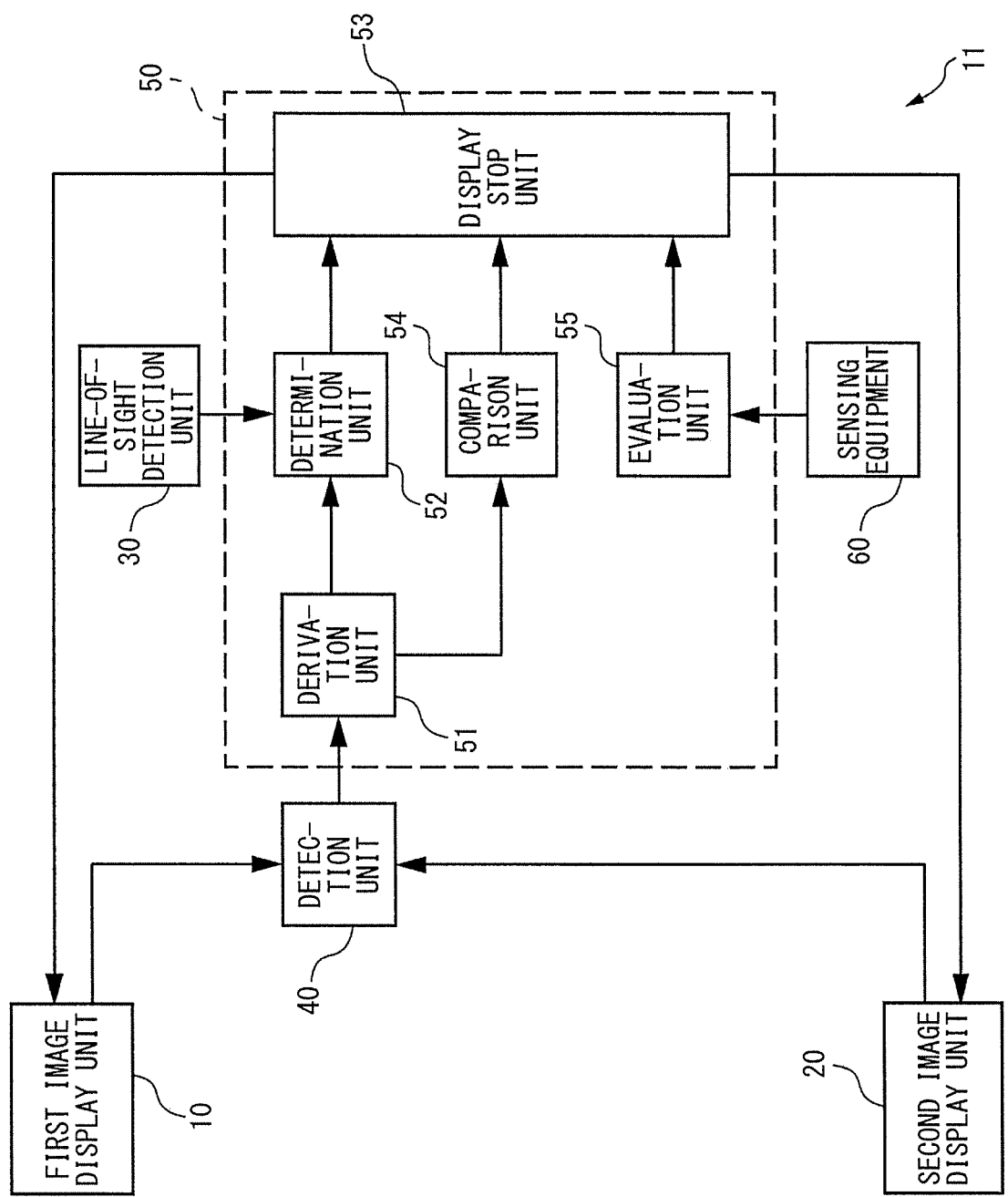
FIG. 8 is a block diagram of a configuration of an image display device according to another implementation of the technology.
Figure 9:
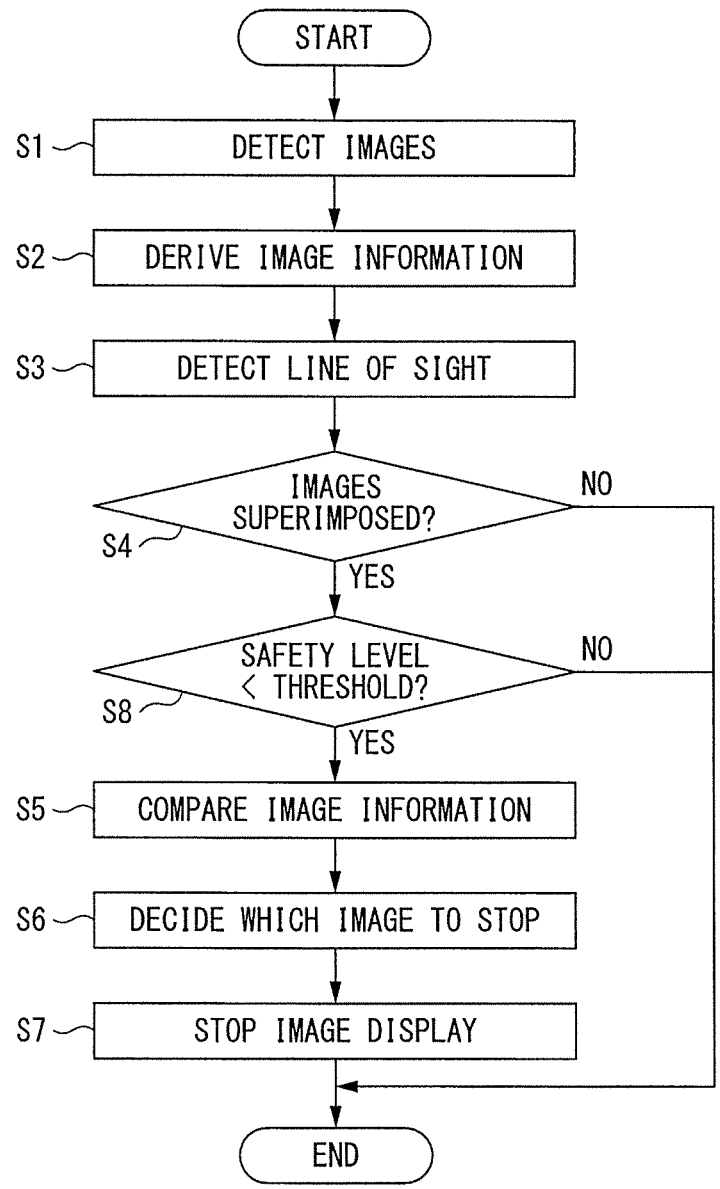
FIG. 9 is a flowchart of a control flow in performing a stop control regarding image display in the image display device illustrated in FIG. 8.
Figure 10:
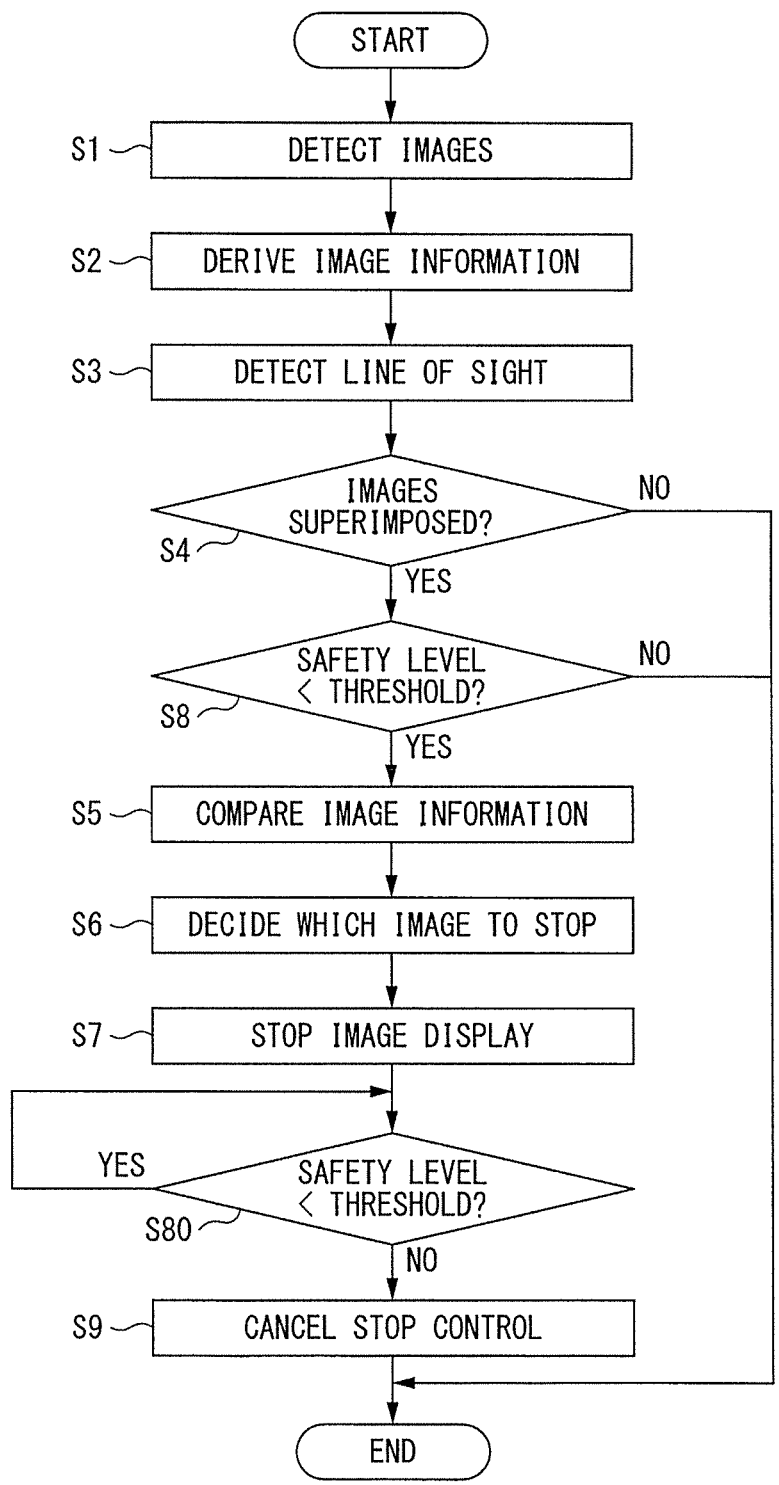
FIG. 10 is a flowchart of a control flow in performing another stop control regarding the image display in the image display device illustrated in FIG. 8.

FIGS. 8 to 10 illustrate some modified implementations of the image display device according to the forgoing implementation of the technology.

It is to be noted that FIG. 8 is a block diagram of a configuration of an image display device 11 according to another implementation of the technology. FIG. 9 is a flowchart of a control flow in performing an image display stop control with the use of constituent elements illustrated in FIG. 8. FIG. 10 is a flowchart of a control flow in performing another image display stop control with the constituent elements illustrated in FIG. 8. Constituent elements common to the image display device 11 illustrated in FIG. 8 and the image display device 1 illustrated in FIG. 6 are denoted by the same reference characters, and detailed description thereof is omitted.

A difference between the image display device 11 illustrated in FIG. 8 and the image display device 1 illustrated in FIG. 6 may lie in presence or absence of an evaluation unit 55. Specifically, the image display device 11 may include the evaluation unit 55, as one of the constituent elements of a controller 50.

The evaluation unit 55 may evaluate a safety level based on surrounding environment of the vehicle 100 as mentioned above. In the implementation as illustrated in FIG. 8, a signal related to an image sensed by sensing equipment 60 may be inputted to the evaluation unit 55.

The surrounding environment of the vehicle 100 may be recognized on the basis of, for example, pedestrian-related information, information related to passage of surrounding vehicles, information related to maps and travel routes by, for example, a navigation system, traffic-related information such as traffic regulation, and information related to a road surface state such as rain and snow. The information to recognize the surrounding environment may be obtained by the sensing equipment 60. The sensing equipment 60 may include, as appropriate, various sensors, a camera, a satellite communication device, an inter-vehicle communication device, and a road-vehicle communication device, without limitation.

The safety level regarding the vehicle 100 may be so set as to vary with magnitude of an influence of the surrounding environment on the travel of the vehicle 100, or with magnitude of a possible influence of the surrounding environment on the travel of the vehicle 100. The safety level as mentioned above may compositely vary with factors, e.g., presence or absence of a pedestrian, a direction in which the pedestrian advances, presence or absence of a surrounding vehicle, a speed of the surrounding vehicle and a direction in which the surrounding vehicle advances, contents of the traffic regulation on the travel route and its surroundings, and the road surface state such as a dry or wet state, and a frozen state. For example, registering in advance the magnitude of the influence on the safety level per each element of the surrounding environment in the form of, for example, a numerical value makes it easier to derive a composite influence on the safety level on the basis of a sensing result by the sensing equipment 60.

In the implementation illustrated in FIG. 8, the signal related to an evaluation result of the safety level by the evaluation unit 55 may be inputted to the display stop unit 53. Thus, the display stop unit 53 may perform a control related to a decision as to whether or not it is necessary to stop displaying the image on the basis of a comparison of the safety level with a threshold, in addition to the image display stop control and the decision control as to which image to stop displaying as mentioned above.

As to the control flow with the use of the image display device 11, for example, as illustrated in FIG. 9, in step S4, in the case with the determination as to the presence of the superimposition of the transmissive image G1 on the road-surface image G2, the evaluation unit 55 may perform an evaluation related to the safety level (step S8). Here, the evaluation may be made by allowing the evaluation unit 55 to derive a difference between the actual safety level and the threshold of the safety level set in advance. The actual safety level may be based on the information on the surrounding environment of the vehicle 100 sensed by the sensing equipment 60. The sensing equipment 60 may include, for example, a camera for vehicle-exterior imaging, and the various sensors. The threshold set here may be, for example, a value that quantifies the actual safety level below which maintaining the normal travel of the vehicle 100 may become difficult.

In a case with an evaluation by the evaluation unit 55 that the actual safety level is lower than the threshold (safety level <threshold), the flow moves on to the next process, i.e., the comparison process (step S5) of the image information as mentioned above (Yes in step S8). In a case with an evaluation by the evaluation unit 55 that the actual safety level is equal to or higher than the threshold (safety level≥threshold), the control flow may be terminated, while the display state of the image is maintained until another image is displayed (No in step S8). The control after the evaluation process (after Yes in step S8) may be similar to the control as described with reference to FIG. 7.

As described, in the implementation as illustrated in FIG. 9, the image display stop control of the transmissive image G1 or the road-surface image G2 is not immediately executed, even in the case with the determination as to the presence of the superimposition of the transmissive image G1 and the road-surface image G2 on each other. Providing the image display device 11 with the evaluation unit 55 makes it possible to keep from executing the image display stop control, insofar as the safety level is maintained that causes no considerable influence on the travel of the vehicle 100, even though the superimposition of the transmissive image G1 on the road-surface image G2 causes the occupant P difficulty in visually recognizing part of the information related to the image. In other words, in the case with the presence of the superimposition of the transmissive image G1 on the road-surface image G2, the image display stop control is executed finally when the actual safety level is lower than the predetermined threshold. Accordingly, it is possible to selectively execute a control of displaying the image having both a high level of necessity and a high level of urgency regarding the vehicle 100. This leads to reduction in chronological changes in the image. The chronological changes mean a situation that the display of the image is stopped. The reduction in the chronological changes in the image allows for reduction in or suppression of a situation that the occupant P is too late to cope with a change in the travel environment of the vehicle 100 because the occupant P have gazed at the chronological changes in the image.

It is to be noted that as another modified implementation of the control flow illustrated in FIG. 9, adopted may be an example of a control in which the flow is not terminated in the case of No in step S8. Instead, insofar as the result of step S8 is No, the determination process of the superimposition of the images (step S4) and the evaluation process of the safety level (step S8) may be repetitively executed while the display state of the images is maintained.

Here, FIG. 10 illustrates another example of a control with the use of the evaluation unit 55 illustrated in FIG. 8. A difference between the control flow illustrated in FIG. 10 and the control flow illustrated in FIG. 9 may lie in that a control is performed to cancel the image display stop control.

In one specific but non-limiting example of the control flow, as illustrated in FIG. 10, in a case with an evaluation that the actual safety level is lower than the predetermined threshold in a first evaluation process of the safety level (Yes in step S8), the flow may be continued until the execution of the process of stopping displaying the image (step S7). Thereafter, a second evaluation process of the safety level may be executed (step S80). In one specific but non-limiting example, the second evaluation process of the safety level (step S80) may be executed as follows. The evaluation unit 55 as mentioned above may re-derive the difference between the safety level regarding the vehicle 100 and the predetermined threshold, on an assumption that the stop control that is going on is cancelled. In other words, the evaluation unit 55 may re-derive the difference, in a case where the display of the necessary image is executed in accordance with chronological changes in the surrounding environment of the vehicle 100 on travel, regardless of the superimposition of the transmissive image G1 and the road-surface image G2 on each other.

In a case with an evaluation by the evaluation unit 55 that the re-derived safety level is higher than the threshold, i.e., in a case with an evaluation by the evaluation unit 55 that the superimposition of the transmissive image G1 on the road-surface image G2 has no influence on the travel of the vehicle 100, or alternatively in a case with an evaluation by the evaluation unit 55 that the influence on the travel of the vehicle 100 becomes smaller even through the transmissive image G1 and the road surface image G2 appear superimposed on each other, the flow may move on to the next process, i.e., a cancellation process (step S9) of the control of stopping displaying the image (No in step S80). Meanwhile, in a case with an evaluation by the evaluation unit 55 that the re-derived safety level is lower than the threshold, i.e., in a case with an evaluation by the evaluation unit 55 that continuation of the superimposition of the transmissive image G1 on the road-surface image G2 may possibly cause an influence on the travel of the vehicle 100, the derivation of the difference between the safety level and the threshold may be repetitively performed, while the state in which the display of the image is stopped is maintained (Yes in step S80).

In one specific but non-limiting example, in a case where the actual safety level temporarily becomes lower than the predetermined threshold (Yes in step S80), and thereafter, the actual safety level becomes higher than the predetermined threshold (No in step S80), the control of the cancellation of the state in which the display of the image is stopped (step S9). Thus, the stop of the display by the first image display unit 10 or the stop of the display by the second image display unit 20 is canceled, making it possible for the occupant P to visually recognize the two images, i.e., both the transmissive image G1 and the road-surface image G2, in the superimposed state on each other, instead of the single image, i.e., any one of the transmissive image G1 and the road-surface image G2. In this process, the two images appear superimposed on each other as they used to, but the occupant P is unlikely to get confused because the cancellation is made, in accordance with the actual safety level, selectively in a case where the travel of the vehicle 100 is barely affected by the cancellation.

As described, in the implementation illustrated in FIG. 10, it is possible to stop the display of the image on the basis of the determination of the superimposition of the transmissive image G1 on the road-surface image G2 and on the basis of the evaluation result of the safety level. Moreover, it is possible to restore the stopped display of the image, i.e., the transmissive image G1 or the road-surface image G2.

In the forgoing, described are some implementations to which the technology made by the inventors is applied, but the contents of the technology are not limited to the description and the figures in the implementations that constitute part of the disclosure of the technology. It should be appreciated that other implementations, examples, and operation techniques made by persons skilled in the art are all included in the scope of the technology.

In one implementation described above, the controllers 5 and 50 illustrated in FIGS. 6 and 8 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controllers 5 and 50. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIGS. 6 and 8.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An image display device for a vehicle, the vehicle traveling on a road and including a first image display unit configured to project at least one first image inside the vehicle for an occupant, the image display device comprising:
a second image display unit configured to project at least one second image on a road surface of the road;
a line-of-sight detection unit configured to detect a line of sight of the occupant; and
a display controller configured to, when the at least one first image projected inside the vehicle and the at least one second image projected on the road surface of the road appear superimposed on each other from a perspective of the occupant based on the detected line of sight of the occupant, stop projecting 1) the at least one first image projected inside the vehicle or 2) the at least one second image projected on the road surface of the road.

2. The image display device according to claim 1, further comprising a determination unit configured to determine whether the at least one first image projected inside the vehicle and the at least one second image projected on the road surface of the road appear superimposed on each other based on one or both of image information of the at least one first image and image information of the at least one second image.

3. The image display device according to claim 2, further comprising a derivation unit configured to derive:
the image information of the at least one first image including at least one of display area of the at least one first image, a display amount of the at least one first image, a number of the at least one first image projected inside the vehicle, and a display position of the at least one first image; and
the image information of the at least one second image including at least one of display area of the at least one second image, a display amount of the at least one second image, number of the at least one second image projected on the road surface of the road, and a display position of the at least one second image.

4. The image display device according to claim 2, further comprising a comparison unit configured to compare the image information of the at least first image with the image information of the at least second image, wherein
the display controller configured to stop projecting 1) the at least one first image projected inside the vehicle or 2) the at least one second image projected on the road surface of the road further based on a comparison result of the comparison unit.

5. The image display device according to claim 2, further comprising an evaluation unit configured to determine a safety level of the vehicle based on a surrounding environment of the vehicle, wherein
the display controller stops projecting 1) the at least one first image projected inside the vehicle or 2) the at least one second image projected on the road surface of the road further based on determining that the safety level of the vehicle is lower than a threshold.

6. The image display device according to claim 2, wherein the vehicle includes headlights, and
the second image display unit includes the headlights.

7. The image display device according to claim 3, further comprising a comparison unit configured to compare the image information of the at least first image with the image information of the at least second image, wherein
the display controller configured to stop projecting 1) the at least one first image projected inside the vehicle or 2) the at least one second image projected on the road surface of the road further based on a comparison result of the comparison unit.

8. The image display device according to claim 3, further comprising an evaluation unit configured to evaluate determine a safety level of the vehicle based on a surrounding environment of the vehicle, wherein
the display controller stops projecting 1) the at least one first image projected inside the vehicle or 2) the at least one second image projected on the road surface of the road further based on determining that the safety level of the vehicle is lower than a threshold.

9. The image display device according to claim 3, wherein the vehicle includes headlights, and
the second image display unit includes the headlights.

10. The image display device according to claim 4, further comprising an evaluation unit configured to determine a safety level of the vehicle based on a surrounding environment of the vehicle, wherein
the display controller stops projecting 1) the at least one first image projected inside the vehicle or 2) the at least one second image projected on the road surface of the road further based on determining that the safety level of the vehicle is lower than a threshold.

11. The image display device according to claim 4, wherein
the vehicle includes headlights, and
the second image display unit includes the headlights.

12. The image display device according to claim 7, further comprising an evaluation unit configured to determine a safety level of the vehicle based on a surrounding environment of the vehicle, wherein
the display controller stops projecting 1) the at least one first image projected inside the vehicle or 2) the at least one second image projected on the road surface of the road further based on determining that the safety level of the vehicle is lower than a threshold.

13. The image display device according to claim 7, wherein
the vehicle includes headlights, and
the second image display unit includes the headlights.

14. The image display device according to claim 1, further comprising an evaluation unit configured to determine a safety level of the vehicle based on a surrounding environment of the vehicle, wherein
the display controller stops projecting 1) the at least one first image projected inside the vehicle or 2) the at least one second image projected on the road surface of the road further based on determining that the safety level of the vehicle is lower than a threshold.

15. The image display device according to claim 1, wherein
the vehicle includes headlights, and
the second image display unit includes the headlights.

* * * * *